Jan. 4, 1966 F. KREUZER 3,227,806

COMMUNICATION SYSTEM FOR TELEPHONE AND TELEPRINTER SERVICE

Filed July 30, 1962 2 Sheets-Sheet 1

Jan. 4, 1966 F. KREUZER 3,227,806

COMMUNICATION SYSTEM FOR TELEPHONE AND TELEPRINTER SERVICE

Filed July 30, 1962 2 Sheets-Sheet 2

United States Patent Office 3,227,806

Patented Jan. 4, 1966

3,227,806

COMMUNICATION SYSTEM FOR TELEPHONE AND TELEPRINTER SERVICE

Friedrich Kreuzer, Munich, Germany, assignor to Siemens & Halske Aktiengesellschaft, Berlin and Munich, Germany, a corporation of Germany Filed July 30, 1962, Ser. No. 213,238
Claims priority, application Germany, Aug. 16, 1961, S 75,299
14 Claims. (Cl. 179—3)

Figure 1:
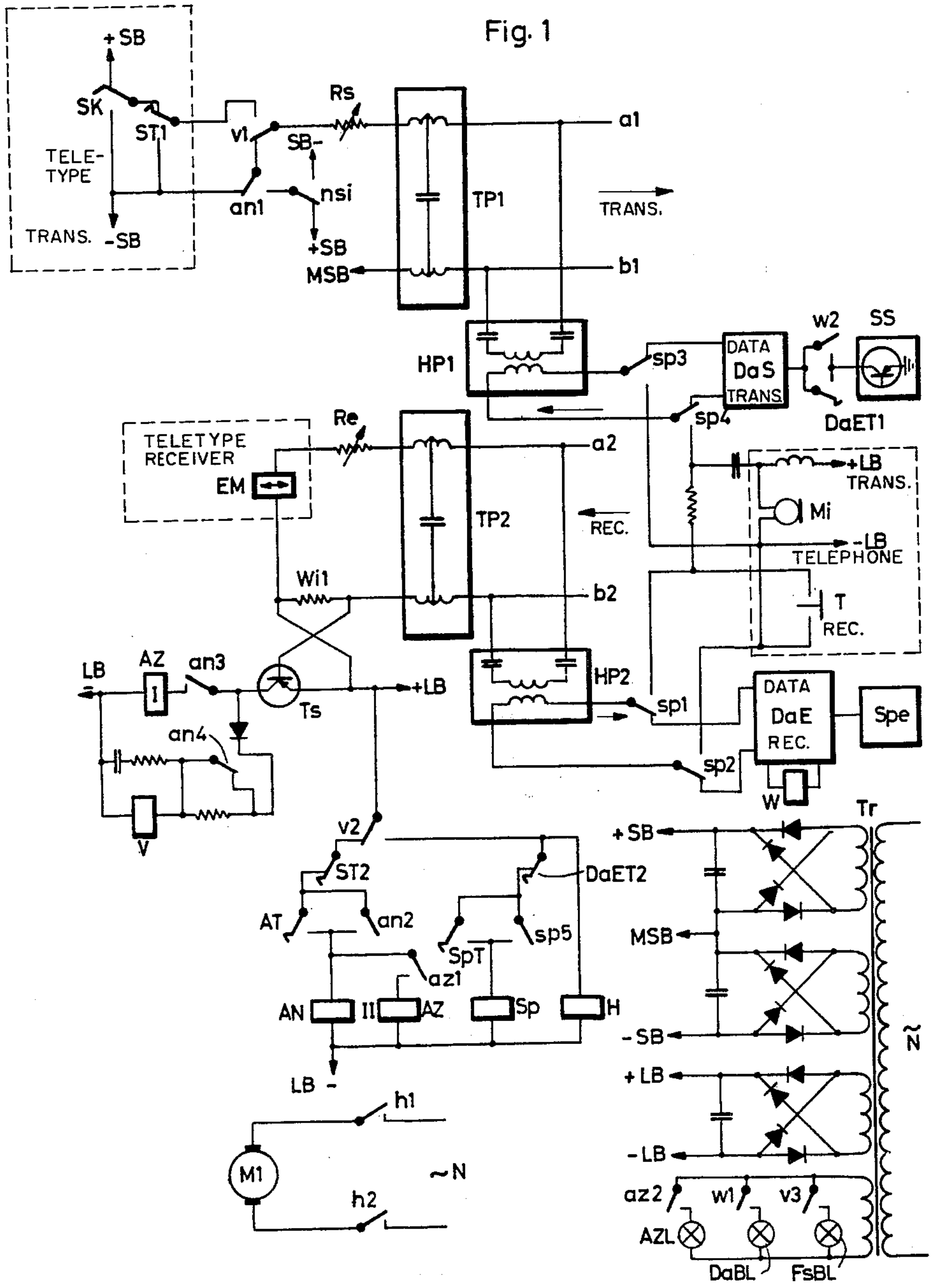

The invention disclosed herein relates to a diversified service communication system and is particularly concerned with an automatic communication system comprising a circuit arrangement for extending telephone calls and teleprinter connections over selection devices which are common to both classes of services.

It is in the communication art known to use for both of these classes of services selection devices and lines which are common thereto. This was until now accomplished by departing from the kind of current which is customarily used for teleprinter transmission, namely, direct current, and using instead for the transmission of teleprinter symbol elements sound frequency current with a frequency lying in range of the voice currents occurring in telephone communication. The teleprinter subscriber stations have for this reason been equipped with sound frequency senders and sound frequency receivers which are over the corresponding subscriber lines connected with selection devices, and which are respectively adapted to produce and to receive sound frequency current lying within the voice current frequencies from 300 . . . 3000 cycles.

However, in order to enable satisfactory teleprinter operation, it was necessary to provide for each teleprinter subscriber at least two frequencies, namely, one sender frequency and one receiver frequency, and to mutually interchange these two frequencies at one of the two subscriber stations between which a connection had been established, so that the calling subscriber, for example, could transmit with the frequency to which the receiving devices at the called station are tuned, and vice versa. Experience teaches that this frequency interchange cannot always be readily effected within the sender- and receiver devices.

Moreover, the frequencies of signal devices disposed in the course of a teleprinter extension, for example, for signalling respectively busy and idle condition of stations, had to be held so constant that they could always be reliably automatically and correctly evaluated at involved teleprinter stations which are not always attended by operators. Telephone- and teleprinter communications over one and the same selection system were rendered difficult by these requirements and prevented commercial success thereof. Separate systems for teleprinter operation and for telephone purposes have therefore been preferred until now.

However, these two kinds of known communication systems are at the present time as yet insufficient for coping with communication requirements, since none of these systems is adapted for the transmission of data controlled by electronic computers. While the teleprinter systems offer excellent supervision of connections and an automatic subscriber control, they are owing to the narrow bandwidth of connection paths or channels wholly unsuitable for high speed data transmission. The telephone systems have connection channels with sufficiently great bandwidth, but some frequencies in the band are in most cases reserved for control operations required in the extension of calls. The absence of a few frequencies does not have any effect in the transmission of speech. However, the requirement of omitting within their frequency bands given frequencies, cannot be posed in connection with data transmitters. It has for this reason been impossible until now, to reliably process over one of the two systems a data transmission, without resorting to considerable expenditure.

The object of the invention is to provide, in an automatic system, a circuit arrangement which is free of these drawbacks while enabling extension of telephone calls and teleprinter connections over selection devices which are common to both services.

The invention proceeds in the solution of the problems involved from the thought that it is not the kind of transmission current for teleprinter symbols, that should be adapted to the kind of transmission current for telephone communication, but that the mode of signalling for telephone purposes should be adapted to the mode of signalling employed for teleprinter operation.

The above stated object is according to the invention realized by providing each subscriber station, irrespective of whether it is to serve only teleprinter communication or only telephone calls or both types of services, with switching means adapted to produce and to evaluate signals for extending connections in accordance with the signalling mode which is customary in the teleprinter art, and to equip the selectors, which partake in the extending of a connection, with a plurality of wipers, sufficient in number so as to simultaneously switch through a four-wire connection for teleprinter purposes and one for telephone purposes, and circuit means for conducting the signals required for the extending of the connection (call signals, dial tone, selection impulse series, idle and busy tone) over the connection path provided for the teleprinter operation.

It is in this manner, in accordance with the invention, possible to extend, over one and the same communication system, teleprinter connections and telephone calls, and to extend over the telephone transmission circuits data, since these circuits are, owing to the signalling which is effected over the circuits provided for teleprinter communication, available as to the full bandwidth thereof without any frequency limitations.

Details of the invention will appear from the description which is rendered below with reference to the accompanying drawings.

Figure 2:
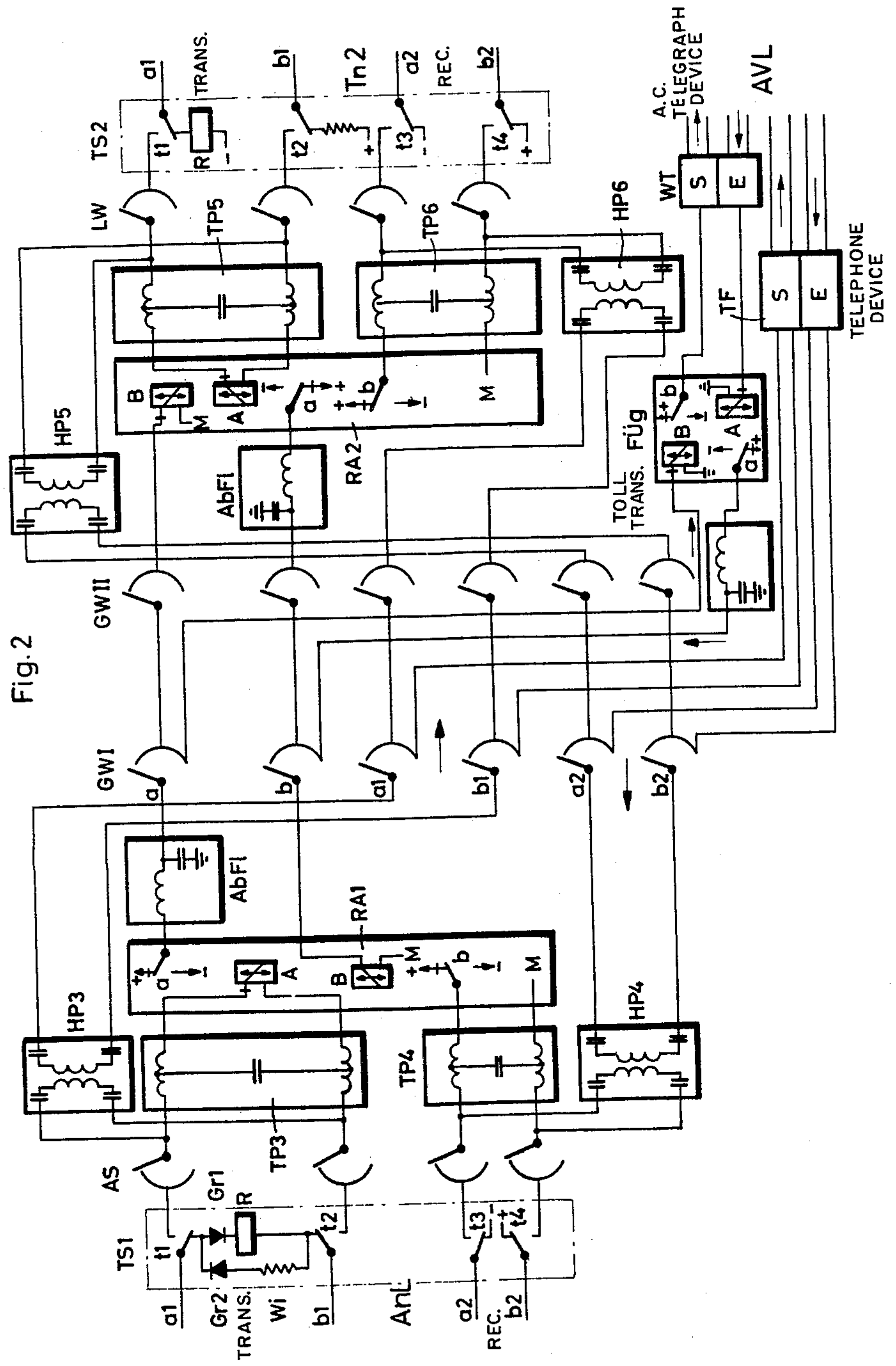

FIG. 1 shows the circuit of a subscriber station constructed according to the invention; and FIG. 2 shows the circuit of an automatic selection system according to the invention.

The subscriber station shown in FIG. 1 is equipped for teleprinter connections, telephone calls and for data operation, representing the switching means which are necessary for an understanding of the invention. The teleprinter apparatus comprises the receiver magnet EM, the sender or transmitter contact SK and the drive motor M1. The telephone station is symbolized by the microphone M*i* and the receiver T. For the data operation are provided the data sender D*a*S and the data receiver D*a*E. All devices are in this embodiment connected over a common four-wire line *a*1, *b*1, and *a*2, *b*2, with the selection system shown in FIG. 2.

The teleprinter symbol elements in the form of direct current signals and the sound frequency voice currents and sound frequency data transmission currents, are transmitted in common over the four-wire connection line *a*1, *b*1 and *a*2, *b*2. To this four-wire line are connected high pass filters HP1 and HP2 serving respectively for the separation and combination of the two transmission current modes. To the output of the high pass filter HP1 can be connected by way of contacts *sp*3 and *sp*4 either the microphone M*i* or the data transmitter D*a*S, while the telephone receiver T or the data receiver D*a*E can be connected to the high pass filter HP2 over the contacts *sp*1 and *sp*2. The teleprinter receiver magnet EM and the teleprinter sender contact SK are respectively connected with the outputs of the low pass filters TP1 and TP2 which are included in the connection line.

It is within the scope of the invention possible to employ a two-conductor connection line, such as is customary in the teleprinter art for a local subscriber. However, this would permit only sectional teleprinter communication and no duplex operation.

According to the invention, the subscriber station comprises switching means which permit the transmission of signals for the extension of connections and for the control of connections, for all three modes of operations or services, in a form such as is customary in teleprinter operation. These switching means are the relays AN, AZ, *Sp*, V and the call key AT, the conclusion key ST, the conversation key *Sp*T and the data switch-in key D*a*ET. The power supply, including a sender battery SB and a local battery LB, consisting of a rectifier arrangement supplied from a commercial source, is common to all three apparatus parts.

FIG. 2 shows an automatic selection system or exchange constructed according to the invention, the subscriber station shown in FIG. 1 being connected with this exchange over the four-wire line comprising the conductors *a*1, *b*1 and *a*2, *b*2. To each subscriber station is assigned a line circuit TS1 which is connected with a call finder AS representing the preselection stage, the call finder being in turn connected with low pass filters TP3, TP4 and high pass filters HP3, HP4, respectively. To the outputs of the low pass filters is connected a relay circuit RA1 which receives the individual teleprinter symbol elements and the signals for extending a connection, while the outputs of the high pass filters HP3, HP4 are connected with lines required for extending the sound frequency paths.

The individual group selection stages (group selectors GWI, GWII for example) are equipped with a plurality of wipers so that they can simultaneously switch through a four-wire circuit for the transmission of individual teleprinter symbol elements and operation control signals as well as a four-wire circuit for the transmission of sound frequency voice currents and data transmission, respectively. The illustrated example shows for the sake of simplicity only the wipers *a*, *b*, *a*1, *b*1, *a*2, *b*2, which are required for transmission current circuits. The wipers required for testing circuits (private wipers) have been omitted to keep the drawing simple. Following the last group selection stage, in the assumed example, the second group selector GWII, there are again arranged frequency gates, in the example, the low pass filters TP5, TP6 and the high pass filters HP5, HP6, serving to combine the previously separately conducted circuits for the transmission of the teleprinter symbols and voice currents. The connector LW has access to the subscriber line circuit TS2 from which extend again conductors such as *a*1, *b*1, *a*2, *b*2, leading to another subscriber station T*n*2. In the lower part of FIG. 2 are indicated a toll transmission FU*g* connected with an alternating current telegraph device WT including a sender S and a receiver E, and a telephone device TF likewise including a sender S and a receiver E. These last named devices WT and TF are connected with a trunk line AVL extending to another exchange.

The operation of the circuits represented in FIGS. 1 and 2 is as follows:

In normal condition, that is, in the absence of a call, start-polarity current flows over the two-conductor line *a*1, *b*1 (FIG. 1) of the four-wire line, in the direction of the exchange (FIG. 2) from —SB, *an*1, *v*1, variable resistor R*s*, conductor *a*1, contact *t*1 (line circuit TS1; FIG. 2), G*r*2, resistor W*i*, *t*2, conductor *b*1, back to the subscriber station (FIG. 1), battery center tap MSB. The line relay R in the subscriber line circuit TS1 is not energized since the rectifier G*r*1 blocks flow of the normal current thereto. Start-polarity current is received at the subscribed station, from the exchange, over the other two-conductor line *a*2, *b*2 of the four-wire line, in a circuit from +, *t*4, *b*2, resistor W*i*1, EM, variable resistor R*e*, *a*2, *t*3, —. Owing to the voltage drop at the resistor W*i*1, the transistor T*s* will be at cutoff and no current will flow through the relay V.

When an outgoing call is to be effected from the subscriber station shown in FIG. 1, the call key AT will be actuated, causing energization of the relay AN which remains independently of the call key AT energized in a holding circuit including its contact *an*2. Contacts *an*3 and *an*4 likewise controlled by relay AN, are placed in preparatory positions, contact *an*1 is actuated to its alternate make-position, thereby causing reversal of the direction of current flow in the two-conductor line *a*1, *b*1, thereby effecting energization of the line relay R in the subscriber line circuit TS1 (FIG. 2). The line relay R actuates a contact (not shown), thereby closing a circuit for starting in known manner the operation of the call finder AS, the latter establishing engagement with the calling line and thereby in known manner effecting energization of the cutoff relay (not shown). The cutoff relay actuates its contacts *t*1, *t*2, *t*3, *t*4, thereby switching the respective two-conductor lines of the four-wire line coming from the subscriber station, through to the relay circuit RA1. The first group selector GWI, which is connected with the relay circuit RA1, transmits to the calling subscriber, over the conductor *b* and the relay B, the exchange signal (taking the place of the dial tone in conventional telephone systems) in the form of a stop-polarity impulse of about 25 milliseconds duration. This exchange signal causes the transistor T*s* to become conductive for the duration thereof, causing energization of the exchange signal relay AZ over its winding I, thereby closing its contact *ax*1 and operatively connecting its winding AZII. Relay V does not operatively energize responsive to the exchange signal owing to an operating delay effected by an RC-combination. The contact *az*2 (right hand bottom part of FIG. 1) is closed to light the lamp AZL, thereby signalling the calling subscriber that he can begin to transmit the selection impulse series (dial impulses).

Upon actuation of the dial, contact *nsi* is operative to transmit to the exchange the selection impulse series, relay A of the relay circuit RA1 responding to such impulses and transferring them to the conductor *a* leading to the group selector GWI. In the case of a local call, for example, to the subscriber station T*n*2, indicated in FIG. 2, which is constructed exactly as the station shown in FIG. 1, the first and second impulse series will in known manner operate the first and second group selectors GWI and GWII, and the third and fourth impulse series, which are transmitted by the relay B of the relay circuit RA2, will operate the connector LW, causing such connector to establish engagement with the called subscriber station T*n*2. In the line circuit TS2 of the called station, there will be actuated the cutoff relay (not shown), the latter actuating its contacts *t*1 to *t*4 and thereby switching through the two two-conductor lines. The contact *b* of the relay B included in the relay circuit RA2, connects over the conductors *a*2, *b*2, stop-polarity current to the called station. The current direction reversal effected at the called station with respect to the two-conductor line *a*2, *b*2, reverses the voltage drop at the resistor W*i*1, whereby the transistor T*s* is made conductive. The relay V, which operates with delayed response due to the action of the RC-combination, can now energize and, by actuating its contact *v*2, energizes the motor switch-in relay H, the latter actuating its contacts *h*1 and *h*2 and thereby connecting the motor M1 of the teleprinter machine to current. Contact *v*3 is actuated to light the teleprinter operation lamp F*s*B1. The contact *v*2, upon switching to its alternate position for the energization of relay H, opens the circuit for the relays AN and AZ, such relays deenergizing, and contact *az*2 opening to extinguish the lamp AZL. The stop polarity is maintained on the two-conductor line *a*1, *b*1, by the switching over of the contact *v*1. The teleprinter connection thus built up is now ready for effecting the desired transmission. As is customary in teleprinter operation, the calling subscriber now requests the station identification text so as to make sure that he is connected with the desired party.

Upon assuming that the subscriber, for example, subscriber T*n*1 (FIG. 1) now transmits this message to the subscriber T*n*2, the sender contact SK of his teleprinter machine will be operative to key the corresponding teleprinter symbols over the two-conductor line *a*1, *b*1, the line circuit TS1, relay circuit RA1, group selectors GWI, GWII, relay circuit RA2, connector LW, called subscriber line circuit TS2, to the called subscriber station T*n*2. The receiver magnet (not shown) of the station T*n*2 receives these telegraph symbols. While the transistor T*s* is incident to the receipt of the individual teleprinter symbol elements blocked in timing with such symbol elements, relay V will not deenergize since the RC-combination is also operative to delay its release.

A connection from the subscriber station T*n*1 to the subscriber station T*n*2 can be analogously extended, for the purpose of exchanging data with the aid of the data sender D*a*S and the data receiver D*a*E. It is for such case assumed that the data transmission devices D*a*S and D*a*E operate according to the frequency modulation method, with stop- and a start frequency. The relay S*p*, provided at the subscriber station, need not be energized for data transmission operation, since the data sender and likewise data receiver are over the high pass filters HP1 and HP2 connected with both of the two-conductor lines of the four-conductor line, by the contacts *sp*1, *sp*2, *sp*3 and *sp*4, in the normal position thereof. The relay W is connected to the data receiver D*a*E for the evaluation of the start frequency; relay W being in released position so long as the data receiver does not receive any frequency. Accordingly, the contacts *w*1 and *w*2, and likewise the data switch-in key D*a*ET1, are open. The data sender will transmit prolonged start frequency, so long as the contacts *w*1, *w*2 and the data switch-in key D*a*ET1 are open.

When the calling subscriber desires to effect a data transmission from his high speed data sender SS, he will actuate the data switch-in key D*a*ET1, thereby causing ground potential in the high speed sender SS to be over a conductive transistor connected to the data sender D*a*S and the latter will transmit the stop frequency. So long as the called subscriber receives the stop frequency, over the circuits already described, the relay W, at his station, will be energized, such relay being, as shown in FIG. 1 allocated to the data receiver D*a*E, and causing by the closure of its contact *w*2 transmission of the stop frequency back to the calling subscriber, as an acknowledgment of the data switching-in. The relay W at the calling station will then also energize and actuate its contacts *w*1 and *w*2. Contact *w*1 connects the data operation lamp D*a*B1 and contact *w*2 maintains the transmission of the stop frequency independent of the data switch-in key D*a*ET1. The lighting of the data operation lamp at both subscriber station signifies the readiness of transmission in both directions.

The calling subscriber can now transmit data with the aid of his high speed sender SS to the storer S*pe* of the called subscriber, regardless of whether the corresponding station is attended or not.

Upon concluding the high speed data transmission, the undisturbed course of which is supervised by the two supervising relays W, the calling subscriber will again request with the aid of his teleprinter machine, the station identification text of the called subscriber, as an assurance that he had been connected with the desired party for the whole duration of the transmission.

According to the invention, subscribers can also be at any time connected for telephone communication. The connection is for this purpose extended in the manner already described for teleprinter operation, and the key S*p*T is thereupon actuated. This causes energization of relay S*p*, thereby actuating the contacts *sp*1 to *sp*4 which disconnect the data sender D*a*S and the data receiver D*a*E from the outputs of the high pass filters HP1 and HP2, operatively connecting instead the microphone M*i* and the receiver T. The switching over of the contacts *sp*1 and *sp*2 disconnects the transmission frequency from the data receivers, causing deenergization of the relays W, if such relays should have been energized in connection with a preceding data operation, the deenergization of the relays W extinguishing the data operation lamp D*a*B1. If the subscribers should at the end of the conversation desire to engage in data transmission, the data switch-in key will be actuated again. Opening of the contact D*a*ET2 releases the relay S*p* and such relay disconnects by means of its contacts *sp*1 to *sp*4, the microphone M*i* and the receiver T, reconnecting instead the data sender D*a*S and data receiver D*a*E to the outputs of the high pass filters HP1 and HP2.

Irrespective of the kind of message exchange, teleprinter- or data operation, for which a connection had been extended, it can be released by the calling or by the called subscriber by depressing the conclusion or release key ST (contacts ST1 and ST2) provided at each station. Upon actuation of the release key, start-polarity current will be transmitted to the exchange over the release key contact ST1. Contact *a* included in the relay circuit RA1 causes release of the connection supervising relay (not shown), the latter causing in known manner release of the cutoff relay (not shown) which controls the contacts *t*1 to *t*4, thereby releasing the connection. Start-polarity will then reappear on the two-conductors *a*2, *b*2 of the four-conductor line, and the transistors will again be at cutoff. The relays V and H restore to normal and the motors M1 of the teleprinter machines are stopped. The operation signalling lamps extinguish, and the two-conductors *a*1, *b*1 are due to restoration of the contact *v*1 switched to prolonged start polarity.

In the event that the subscriber station should be set for "conversation," when the release signal is given, relay S*p* will be released responsive to restoration of contact *v*2, thereby switching the subscriber station for the building up of connection, again to data operation, that is, the data sender D*a*S and the data receiver D*a*E will be reconnected to the outputs of the high pass filters HP1 and HP2.

In the event that the connection is released during a "data transmission," relay W will be restored owing to cessation of transmission frequency, relay W restoring its contact *w*1, thereby extinguishing the data operation lamp D*a*B1 and thus signalling the release of the connection.

It is within the scope of the invention not absolutely necessary that each subscriber station connected to the automatic exchange be equipped with devices for all three modes of operation. For example, a subscriber station equipped only for telephone operation, may be connected to the exchange. It is in such case merely necessary that such station be equipped with switching means required for the telegraphic signalling. A subscriber station intended only for teleprinter operation may likewise be connected to the automatic exchange.

Changes may be made within the scope and spirit of the appended claims which define what is believed to be new and desired to have protected by Letters Patent.

I claim:

1. An automatic communication system for the extension of telephone connections and teleprinter connections, between two subscriber stations by self-selection at a subscriber station, over exchange selector devices which are common to and the same for both types of connections, comprising respective lines operatively connecting each subscriber station to the allocated automatic exchange, each subscriber station being so connected by the two lines independent of one another, respective transmitters for telephone and teleprinter transmissions, and respective receivers for telephone and teleprinter reception, said transmitter being connectable in each case over one of such two lines, and said receivers over the other of such two lines, a high pass filter and a low pass filter connectable in each of such two lines, forming two transmission connection paths simultaneously present on each of the two lines but seperated in frequency, and comprising four-wire path for telephone and data transmission and a four-wire path for teleprinter transmission, each subscriber station, irrespective of whether it is intended solely for teleprinter traffic, solely for telephone traffic or both, being provided with signal generating and signal receiving switching means operable for initiating the extension of connections on said lines, said means being connectable to the four-wire connection path, provided for teleprinter signals and operable to generate connection extension signals such as call signals, selection start signals, selection impulse series, free and busy signals, solely over said four-wire connection path provided for teleprinter transmission, for effecting corresponding actuation of said exchange selector devices and connection of the respective transmission paths between the subscriber stations.

2. A system according to claim 1 comprising a four-wire subscriber line for connecting each subscriber station with the automatic exchange, said subscriber line being within said exchange provided with frequency gate means for mutually separating respectively the direct current teleprinter circuits and the sound frequency current circuits extended over said subscriber line.

3. A system according to claim 1, comprising a two-conductor subscriber line for connecting each subscriber station with said exchange, said subscriber line being within said exchange provided with frequency gate means for mutually separating respectively the direct current teleprinter circuits and the sound frequency current circuits extended over said subscriber line.

4. A system according to claim 1, comprising, disposed in said exchange, frequency gate means for mutually separating direct current teleprinter circuits and sound frequency current circuits, and group selectors provided with individual wipers connected with the outputs of the respective frequency gate means, for switching through the corresponding circuits.

5. A system according to claim 1, comprising high pass filter means and low pass filter means constituting frequency gate means for mutually separating direct current teleprinter circuits and sound frequency circuits.

6. A system according to claim 1, comprising in each subscriber station frequency gate circuits constructed of high pass filter and low pass filter means connected at each subscriber station to the conductors of the respective subscriber line, teleprinter devices, telephone devices and data devices, and circuit means for connecting the respective devices with the outputs of said frequency gate circuits.

7. A system according to claim 5, comprising telephone apparatus arranged at a subscriber station, switching means for connecting said telephone apparatus with the output of the high pass filter forming part of the frequency gate means, and data sender and data receiver devices respectively connected with said switching means.

8. A system according to claim 1, including a subscriber station intended solely for teleprinter operation, and circuit means for connecting through to the first group selector stage only the direct current outputs of the frequency gate means thereof.

9. A system according to claim 1, comprising at each subscriber station data sender and data receiver means, a call key, a release key, a conversation key and a data switching-in key.

10. A system according to claim 9, comprising at each subscriber station at least two connection supervising relays, a first one of said relays being operable by direct current of given direction and strength and the second one of said relays being operable by sound frequency current of given frequency.

11. A system according to claim 10, comprising an RC-combination for making said first relay slow to energize, a transistor for controlling the operation of said relay, and means for conducting to said transistor control voltage from the subscriber line.

12. A system according to claim 1, comprising data sender and data receiver means, station identification verification being effected respectively at the start and at the conclusion of data transmission.

13. A system according to claim 1, comprising individual to each subscriber station a direct current source for supplying the respective subscriber line and switching devices at the corresponding station.

14. A system according to claim 1, comprising a data sender and a data receiver, and a storage device connected with the data receiver.

References Cited by the Examiner

UNITED STATES PATENTS

| | | | |
|---|---|---|---|
| 2,085,637 | 6/1937 | Collins | 179—4 |
| 2,095,415 | 10/1937 | Kleinschmidt | 179—2 |

FOREIGN PATENTS

| | | |
|---|---|---|
| 1,111,677 | 7/1961 | Germany. |

DAVID G. REDINBAUGH, *Primary Examiner.*